US011639797B2

(12) United States Patent
McKee et al.

(10) Patent No.: US 11,639,797 B2
(45) Date of Patent: May 2, 2023

(54) COOKING OVEN HAVING AN ACTIVE VENT

(71) Applicant: Ovention, Inc., Milwaukee, WI (US)

(72) Inventors: Philip R. McKee, Frisco, TX (US); Alex Wayne Johnson, Mesquite, TX (US)

(73) Assignee: OVENTION, INC., Milwaukee, WI (US)

( * ) Notice: Subject to any disclaimer, the term of this patent is extended or adjusted under 35 U.S.C. 154(b) by 837 days.

(21) Appl. No.: 15/876,672

(22) Filed: Jan. 22, 2018

(65) Prior Publication Data

US 2018/0142900 A1 May 24, 2018

Related U.S. Application Data

(63) Continuation-in-part of application No. 14/704,732, filed on May 5, 2015, now Pat. No. 9,874,358.

(51) Int. Cl.
*F24C 7/08* (2006.01)
*A21B 1/24* (2006.01)
(Continued)

(52) U.S. Cl.
CPC ............... *F24C 7/085* (2013.01); *A21B 1/22* (2013.01); *A21B 1/245* (2013.01); *A21B 1/26* (2013.01);
(Continued)

(58) Field of Classification Search
CPC .. A21B 1/245; A21B 1/26; A21B 1/22; A21B 1/00; A21B 2/00; F24C 15/325; F24C 7/085; F24C 7/046; F24C 7/087
See application file for complete search history.

(56) References Cited

U.S. PATENT DOCUMENTS 3,861,378 A * 1/1975 Rhoads .................... A21B 1/26
219/400
4,338,911 A 7/1982 Smith
(Continued)

FOREIGN PATENT DOCUMENTS

AU          2635977 A     1/1979
CN       201167569 Y    12/2008
(Continued)

OTHER PUBLICATIONS

International Search Report for PCT/US2016/029346 dated Jul. 27, 2016.
(Continued)

*Primary Examiner* — Dana Ross
*Assistant Examiner* — Joe E Mills, Jr.
(74) *Attorney, Agent, or Firm* — Quarles & Brady LLP

(57) ABSTRACT

An oven comprising a housing, a cook cavity located within the housing, wherein the housing includes an opening to the cook cavity and the cook cavity is configured to receive a food item through the opening, an oven door for covering the opening, a heating element configured to heat an air within the cook cavity, an active vent interconnecting the cook cavity and an outside of the housing, and a controller operatively coupled to the active vent and the heating element is disclosed. The controller is configured to perform the steps of (a) turning on the heating element to initiate a cooking cycle, (b) keeping the active vent closed during an initial stage of the cooking cycle, (c) after the initial stage of the cooking cycle, opening the active vent, and (d) keeping the active vent open during at least a portion of a remainder of the cooking cycle.

28 Claims, 13 Drawing Sheets

(51) Int. Cl.
*A21B 1/26* (2006.01)
*F24C 15/32* (2006.01)
*A21B 2/00* (2006.01)
*F24C 7/04* (2021.01)
*A21B 1/22* (2006.01)
*G06Q 10/087* (2023.01)
*G01C 21/34* (2006.01)

(52) U.S. Cl.
CPC ............... *A21B 2/00* (2013.01); *F24C 7/046* (2013.01); *F24C 7/087* (2013.01); *F24C 15/325* (2013.01); *G01C 21/343* (2013.01); *G06Q 10/087* (2013.01)

(56) References Cited

U.S. PATENT DOCUMENTS

| | | | |
|---|---|---|---|
| 4,477,706 A * | 10/1984 | Mittelsteadt | .......... F24C 15/325 |
| | | | 219/400 |
| 4,517,448 A | 5/1985 | Crain et al. | |
| 4,739,697 A | 4/1988 | Roberts | |
| 4,756,091 A | 7/1988 | Van Denend | |
| 4,881,519 A | 11/1989 | Henke | |
| 4,922,079 A | 5/1990 | Bowen et al. | |
| 4,924,072 A * | 5/1990 | Oslin | ...................... A47J 27/04 |
| | | | 219/400 |
| 4,951,648 A | 8/1990 | Shukla et al. | |
| 5,382,441 A | 1/1995 | Lentz et al. | |
| 5,423,248 A | 6/1995 | Smith | |
| 5,473,975 A | 12/1995 | Bruno et al. | |
| 5,532,456 A | 7/1996 | Smith et al. | |
| 5,867,920 A | 2/1999 | Rogne et al. | |
| 5,906,485 A | 5/1999 | Groff et al. | |
| 6,114,664 A | 9/2000 | Cook et al. | |
| 6,369,360 B1 | 4/2002 | Cook | |
| 6,521,870 B2 | 2/2003 | Nolan et al. | |
| 6,566,638 B2 | 5/2003 | Brown | |
| 6,595,117 B1 | 7/2003 | Jones et al. | |
| 6,776,151 B2 | 8/2004 | Wiersma et al. | |
| 6,874,495 B2 | 4/2005 | McFadden | |
| 6,878,910 B2 | 4/2005 | Kim et al. | |
| 6,913,012 B2 | 7/2005 | Divett et al. | |
| 6,987,246 B2 | 1/2006 | Hansen et al. | |
| 7,009,147 B1 | 3/2006 | Schulte | |
| 7,055,518 B2 | 6/2006 | McFadden et al. | |
| 7,220,944 B2 | 5/2007 | Miller et al. | |
| 7,235,763 B2 | 6/2007 | Christiaansen et al. | |
| 7,360,533 B2 | 4/2008 | McFadden | |
| 7,507,938 B2 | 3/2009 | McFadden | |
| 7,836,875 B2 | 11/2010 | McFadden et al. | |
| 7,886,658 B2 | 2/2011 | McFadden et al. | |
| 7,946,224 B2 | 5/2011 | McFadden | |
| 7,997,189 B1 | 8/2011 | Baker et al. | |
| 8,006,685 B2 | 8/2011 | Bolten et al. | |
| 8,011,293 B2 | 9/2011 | McFadden et al. | |
| 8,035,062 B2 | 10/2011 | McFadden et al. | |
| 8,076,614 B2 | 12/2011 | Baker et al. | |
| 8,272,320 B2 | 9/2012 | Baker et al. | |
| 8,294,070 B2 | 10/2012 | McNamee et al. | |
| 8,297,270 B2 | 10/2012 | McFadden | |
| 8,637,792 B2 | 1/2014 | Agnello et al. | |
| 8,637,793 B2 | 1/2014 | Kwag et al. | |
| 8,642,928 B2 | 2/2014 | Schulte | |
| 8,658,953 B2 | 2/2014 | McFadden et al. | |
| 8,893,705 B2 | 11/2014 | McFadden | |
| 9,161,547 B2 | 10/2015 | McKee | |
| 9,191,999 B2 | 11/2015 | Anthony et al. | |
| 10,765,119 B2 | 9/2020 | Johnson et al. | |
| 2002/0134368 A1 | 9/2002 | Moshonas et al. | |
| 2008/0141867 A1 | 6/2008 | Cavada et al. | |
| 2009/0008379 A1* | 1/2009 | Ingemanson | ........ H05B 3/0076 |
| | | | 219/395 |
| 2009/0139976 A1 | 6/2009 | Lee | |
| 2009/0178575 A1 | 7/2009 | Baker et al. | |
| 2010/0301034 A1* | 12/2010 | Greenwood | ............ F24C 7/006 |
| | | | 219/400 |
| 2011/0139140 A1 | 6/2011 | Baker et al. | |
| 2011/0276184 A1 | 11/2011 | McKee et al. | |
| 2012/0294992 A1 | 11/2012 | Sager | |
| 2013/0239945 A1 | 9/2013 | Han et al. | |
| 2014/0216434 A1 | 8/2014 | Moreth, III et al. | |
| 2014/0261371 A1 | 9/2014 | Van Camp et al. | |
| 2014/0311360 A1* | 10/2014 | Bartelick | .............. F24C 15/327 |
| | | | 99/468 |
| 2014/0348987 A1 | 11/2014 | Cheng et al. | |
| 2016/0348918 A1 | 12/2016 | Bhogal et al. | |
| 2018/0142900 A1 | 5/2018 | McKee et al. | |

FOREIGN PATENT DOCUMENTS

| | | |
|---|---|---|
| EP | 0423048 A1 | 4/1991 |
| EP | 1468610 A1 | 10/2004 |
| WO | 1990008449 A1 | 7/1990 |

OTHER PUBLICATIONS

Written Opinion of International Searching Authority for PCT/US2016/029346 dated Jul. 27, 2016.
Barbara Alpern, Steam in Bread Baking: How Steam Can Transform Your Bread From Dull to Dazzling, Flourish (Feb. 28, 2017), http://blog.kingarthurflour.com/2017/02/28/steam-in-bread-baking/.

* cited by examiner

COOKING OVEN HAVING AN ACTIVE VENT

CROSS REFERENCE TO RELATED APPLICATION

This application is a continuation-in-part of U.S. application Ser. No. 14/704,732, filed on May 5, 2015, the entire content of which is incorporated herein by reference.

FIELD OF INVENTION

The present invention relates to cooking ovens in general, and in particular to a cooking oven based on a combination of rapidly moving heated air and infrared heating element and also to a cooking oven having an active vent.

BACKGROUND OF THE INVENTION

Hot air convective cooking is achieved by directing rapidly moving heated air at the food. Hot air heated in an air plenum is introduced into the oven cavity via air channels interconnecting the air plenum and the oven cavity. In general, optimal cooking air temperatures are in the 450° F.-500° F. range for non-bakery items, and in the 375° F. range for bakery items.

Infrared ("IR") heating is another well-known cooking method, whereby electromagnetic waves emitted by a heat source (typically a heating element in the form of a resistance wire) are absorbed by food. Cooking efficiency is achieved by matching the wavelength of the infrared radiation to the absorption characteristics of the food material. In general, IR heating is considered to be most efficient in cooking food when the heating element is at or near 1,200° F.—since the wavelength emitted at that temperature most closely matches food.

So far, attempts to combine heated air and IR heating have achieved limited commercial success due to certain technical challenges as discussed below.

Hot air for cooking food is typically at a temperature (e.g., 450° F.-500° F.) well below the temperature of the IR heating element (ideally at 1,200° F.). Hence, rapidly moving air at a much lower temperature cools the hotter IR heating element in the same oven cavity very quickly. To avoid this problem, an oven having both hot air and IR heating elements needs to separate the airstream from the IR heating element. However, prior attempts to solve this problem were not satisfactory.

For example, U.S. Pat. No. 4,756,091 to Van Denend describes entry of hot air into the oven cavity via tubes, with those tubes being separated from the IR heating elements. However, an IR heating element at a temperature near 1,200° F. emits heat towards the surrounding structure such as air plenum. When the plenum gets hot (such as to 800° F. or more), it is no longer possible to keep the air temperature in the desired range (such as between 450° F. and 500° F.).

Previous attempts to isolate hot air from the IR heating elements have also included the use of IR heating elements which are housed in or shielded behind isolating surfaces made of glass or ceramic, or reflectors, as described in U.S. Pat. No. 6,521,870 to Nolan et al. and U.S. Pat. No. 6,114,664 to Cook et al. However, those attempts did not provide satisfactory solutions because (1) over time, the glass or ceramic surfaces and reflectors became splattered with grease which burned on to that surface and continually degraded the IR emissivity; and (2) ultimately, the glass or ceramic materials chipped or broke, landing on the food being cooked in the oven cavity.

It is also desirable to control the temperature and/or moisture level within a cook cavity of an oven more accurately and precisely during the cooking process.

SUMMARY OF THE INVENTION

It has now been found that the above and related objects of the present invention are obtained in the form of several related aspects, including an oven based on a combination of heated air and infrared heating element.

More particularly, the present invention relates to an oven comprising a housing, a cavity located within the housing, wherein the housing includes an opening to the cavity, an oven door for covering the opening, an air plenum, an air heating element for heating air in the air plenum, an infrared heating element for providing heat to the cavity, the infrared heating element comprising a wire-like heating element shaped in a serpentine pattern to form a plurality of fingers, and a thermal insulating layer placed between the infrared heating element and the air plenum, the thermal insulating layer comprising a plurality of air channels interconnecting the air plenum and the cavity and one or more temperature decoupling chambers for thermally insulating the air plenum from the infrared heating element, wherein the plurality of air channels are positioned interleavingly between the plurality of fingers so that air streams coming from the air plenum through each of the air channels into the cavity do not substantially contact the infrared heating element.

In at least one embodiment, the temperature decoupling chambers use air as a thermal insulator.

In at least one embodiment, the oven further comprises a user interface for controlling the infrared heating element.

In at least one embodiment, the oven further comprises a user interface for controlling a temporal profile and a power level of the infrared heating element.

In at least one embodiment, the user interface comprises an option to control the infrared heating element to be used solely to boost heated air temperature within the cavity.

In at least one embodiment, the thermal insulating layer in the oven comprises a stainless steel sheet.

In at least one embodiment, the vertical length of each of the plurality of air channels is between 0.5 inches and 12 inches.

In at least one embodiment, the closest distance between the air outlet side of the plurality of air channels and the infrared heating element is between 0.1 inches and 4 inches.

In at least one embodiment, the closest distance between the surface of the thermal insulating layer on the air outlet side and the infrared heating element is between 0.1 inches and 1 inch.

In addition, the present invention also relates to an oven comprising a housing, a cook cavity located within the housing, wherein the housing includes an opening to the cook cavity and the cook cavity is configured to receive a food item through the opening, an oven door for covering the opening, a heating element configured to heat an air within the cook cavity, an active vent interconnecting the cook cavity and an outside of the housing, and a controller operatively coupled to the active vent and the heating element, the controller comprising one or more processors and one or more memories operatively coupled to the one or more processors and having stored thereon instructions that are executable by the one or more processors to cause the controller to perform the steps of (a) turning on the heating element to initiate a cooking cycle; (b) keeping the active vent closed during an initial stage of the cooking cycle; (c) after the initial stage of the cooking cycle, opening the active vent; and (d) keeping the active vent open during at least a portion of a remainder of the cooking cycle.

In at least one embodiment, the controller is configured to control the moisture level within the cook cavity by opening or closing the active vent.

In at least one embodiment, the controller is configured to control heating and cooling of the cook cavity by opening or closing the active vent.

In at least one embodiment, the active vent comprises a rotatable flap and the controller is configured to control rotation of the flap to open or close the active vent.

In at least one embodiment, the active vent is configured to enable reduction of excess heat buildup within the cook cavity.

In at least one embodiment, the active vent is configured to enable a fast cooling down of the cook cavity.

In at least one embodiment, the initial stage of the cooking cycle comprises an initial ½ of the cooking cycle and the remainder of the cooking cycle comprises remaining ½ of the cooking cycle.

In at least one embodiment, the initial stage of the cooking cycle comprises an initial ⅓ of the cooking cycle and the remainder of the cooking cycle comprises remaining ⅔ of the cooking cycle.

In at least one embodiment, the initial stage of the cooking cycle comprises an initial ¼ of the cooking cycle and the remainder of the cooking cycle comprises remaining ¾ of the cooking cycle.

In at least one embodiment, the oven further comprises an air plenum positioned above or below the cook cavity, the air plenum being configured to introduce the air into the cook cavity.

In at least one embodiment, the heating element is positioned between the air plenum and the cook cavity.

In at least one embodiment, the heating element comprises one or more infrared heating elements.

In at least one embodiment, each of the one or more infrared heating elements comprises a spirally wound wire element.

In at least one embodiment, the one or more infrared heating elements are configured to operate under an infrared mode for toasting the food item in the cook cavity or under an air heating mode for heating the air within the cook cavity without toasting the food item.

In at least one embodiment, the controller is configured to control the one or more infrared heating elements by selecting between the infrared mode and the air heating mode.

In at least one embodiment, the controller is configured to control a temporal profile and a level of a power applied to the one or more infrared heating elements.

In at least one embodiment, the controller is configured to apply one or more pulses to the one or more infrared heating elements, each of the one or more pulses having predefined time duration and power level.

In at least one embodiment, the controller further comprises a user interface for receiving a command or an input from a user, the user interface being operatively connected to the one or more processors.

In at least one embodiment, the heating element comprises one or more infrared heating elements and each of the one or more infrared heating elements is separated from the air plenum by a shield comprising a layer of a non-perforated sheet metal.

In at least one embodiment, the heating element comprises one or more infrared heating element and each of the one or more infrared heating elements is separated from the cook cavity by a guard comprising a layer of a perforated sheet metal.

In at least one embodiment, the heating element comprises a substantially horizontal array of multiple infrared heating elements.

In at least one embodiment, the oven further comprises air channels, wherein the heating element comprises a substantially horizontal array of multiple infrared heating elements and each of the air channels is positioned between two of the infrared heating elements that are adjacent to each other, the air channels being configured to allow air flow from the air plenum to the cook cavity.

In at least one embodiment, the oven further comprises a blower configured to expel the air within the cook cavity to the outside of the housing through a first portion of the active vent.

In at least one embodiment, the blower is further configured to also draw in an ambient air from the outside of the housing into the cook cavity through a second portion of the active vent and the second portion of the active vent is different from the first portion of the active vent.

In at least one embodiment, the active vent comprises a divider separating the first portion and the second portion.

In at least one embodiment, the oven further comprises a thermocouple operatively coupled to the controller, the thermocouple being configured to measure an air temperature within the cook cavity and transmit data relating to the air temperature to the controller.

In at least one embodiment, the oven further comprises a sensor operatively coupled to the controller, the sensor being configured to measure a moisture level within the cook cavity and transmit data relating to the moisture level to the controller.

Furthermore, the present invention also relates to a method of controlling a moisture level within an oven during a cooking cycle, the oven comprising a housing, a cook cavity located within the housing, a heating element configured to heat an air within the cook cavity, and an active vent interconnecting the cook cavity and an outside of the housing, the method comprising the steps of (a) turning on the heating element to initiate the cooking cycle; (b) keeping the active vent closed during an initial stage of the cooking cycle; (c) after the initial stage of the cooking cycle, opening the active vent; and (d) keeping the active vent open during at least a portion of a remainder of the cooking cycle.

In at least one embodiment, the initial stage of the cooking cycle comprises an initial ½ of the cooking cycle and the remainder of the cooking cycle comprises remaining ½ of the cooking cycle.

In at least one embodiment, the initial stage of the cooking cycle comprises an initial ⅓ of the cooking cycle and the remainder of the cooking cycle comprises remaining ⅔ of the cooking cycle.

In at least one embodiment, the initial stage of the cooking cycle comprises an initial ¼ of the cooking cycle and the remainder of the cooking cycle comprises remaining ¾ of the cooking cycle.

These and other features, capabilities and advantages of the disclosed subject matter, along with the invention itself, will be more fully understood after a review of the following figures, detailed descriptions and claims.

BRIEF DESCRIPTION OF THE DRAWINGS

Exemplary embodiments of the present invention will be described with references to the accompanying figures, wherein.

DETAILED DESCRIPTION OF PREFERRED EMBODIMENTS

Figure 1A:
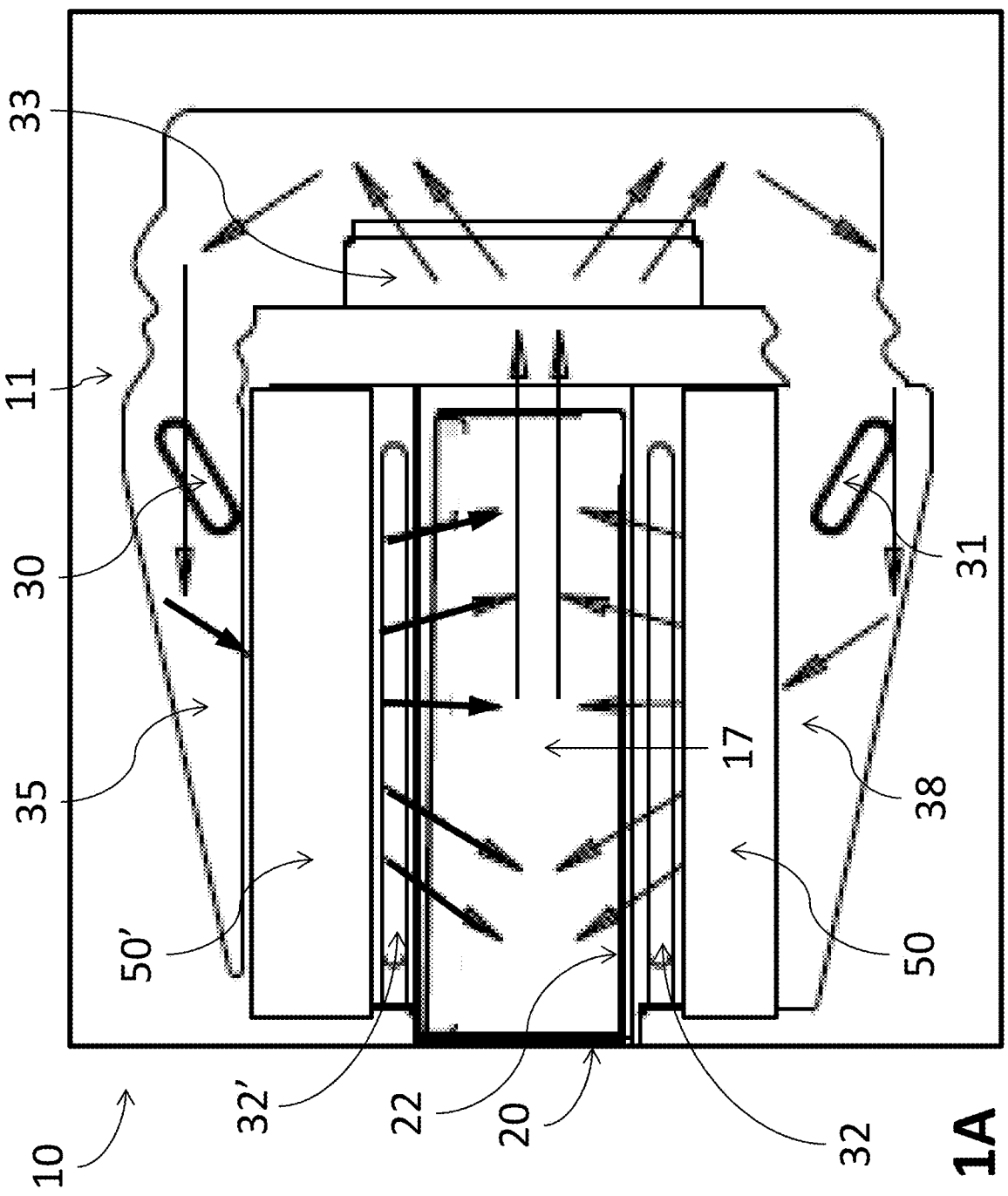
FIGS. 1A-1B are respectively side cross-sectional view and front cross-sectional view of a cooking oven, in accordance with an exemplary embodiment of the present invention.
Figure 1B:
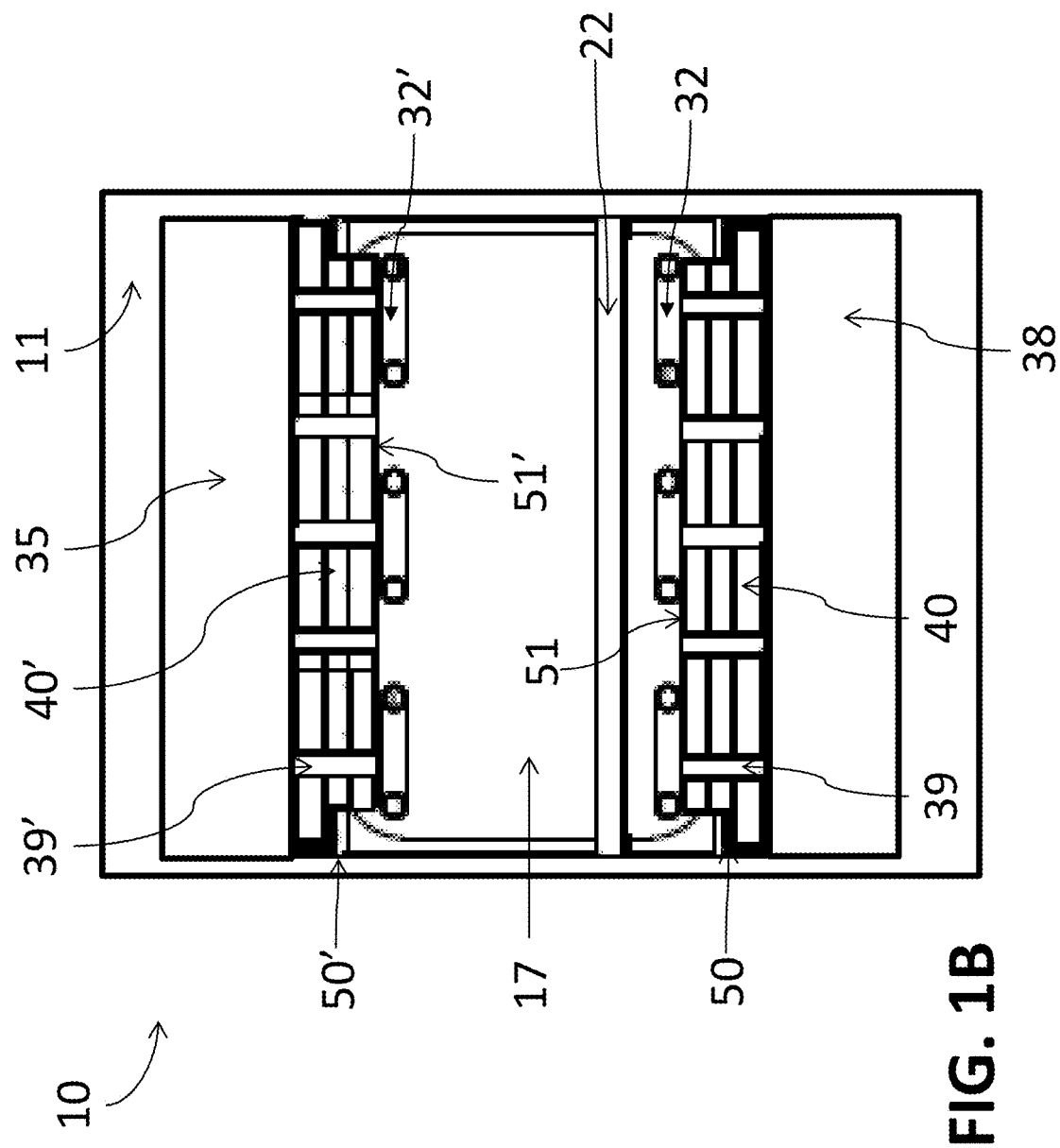

Referring now to the drawings and in particular to FIGS. 1A and 1B, there are depicted respectively side and front cross-sectional views of an oven, in accordance with an exemplary embodiment of the present invention. As shown, an oven 10 includes a housing 11, a cavity 17 located within the housing, and an oven door 20 for covering an opening to the cavity, through which a food item may be loaded on a food loading section 22 in the cavity for cooking.

The oven 10 includes a heating and airflow system to supply heat to cavity 17 for heating up any food items that have been placed within the cavity 17. The heating and airflow system may include a top air heating element 30 for heating air in a top air plenum 35, and/or a bottom air heating element 31 for heating air in a bottom air plenum 38. The heating system may also include a top infrared (IR) heating element 32' located below the top air plenum 35, and/or a bottom IR heating element 32 located above the bottom air plenum 38 and below the food loading section 22. It is understood by those skilled in the art that other heating means, such as microwave, steam or a combination thereof, can also be used in addition to air/IR heating elements 30-32.

As shown in FIGS. 1A and 1B, top air plenum 35 and top IR heating element 32' are separated by a top thermal insulating layer 50'. The top thermal insulating layer 50' comprises a plurality of air channels or air tubes 39' that enable top air plenum 35 to be in gaseous communication with cavity 17. The top thermal insulating layer 50' may also comprise one or more temperature decoupling chambers 40' for thermally insulating top air plenum 35 from top IR heating element 32'. For example, the temperature decoupling chambers 40' may be filled with air which can act as a thermal insulator.

Likewise, bottom air plenum 38 and bottom IR heating element 32 are separated by a bottom thermal insulating layer 50. The bottom thermal insulating layer 50 comprises a plurality of air channels or air tubes 39 that enable bottom air plenum 38 to be in gaseous communication with cavity 17. The bottom thermal insulating layer 50 may also comprise one or more temperature decoupling chambers 40 for thermally insulating bottom air plenum 38 from bottom IR heating element 32. For example, the temperature decoupling chambers 40 may be filled with air which can act as a thermal insulator.

Air may be heated by either top air heating element 30 or bottom air heating element 31 or both before entering the oven cavity 17 through air channels 39', 39. The heated air can be directed to the cavity via either top air plenum 35 or bottom air plenum 38 or both. In alternative embodiments, air could enter cavity 17 either through top air plenum 35 or bottom air plenum 38 at any given time, but not through both plenums 35, 38 simultaneously. The air within the cavity 17 is subsequently taken out of the cavity 17 via a centrifugal blower 33. The blower 33 then moves the air into top air plenum 35 and/or bottom air plenum 38. FIG. 1A shows a set of arrows that indicates general directions of the air flow when the oven 10 is in operation, in accordance with an exemplary embodiment of the present invention.

Figure 2A:
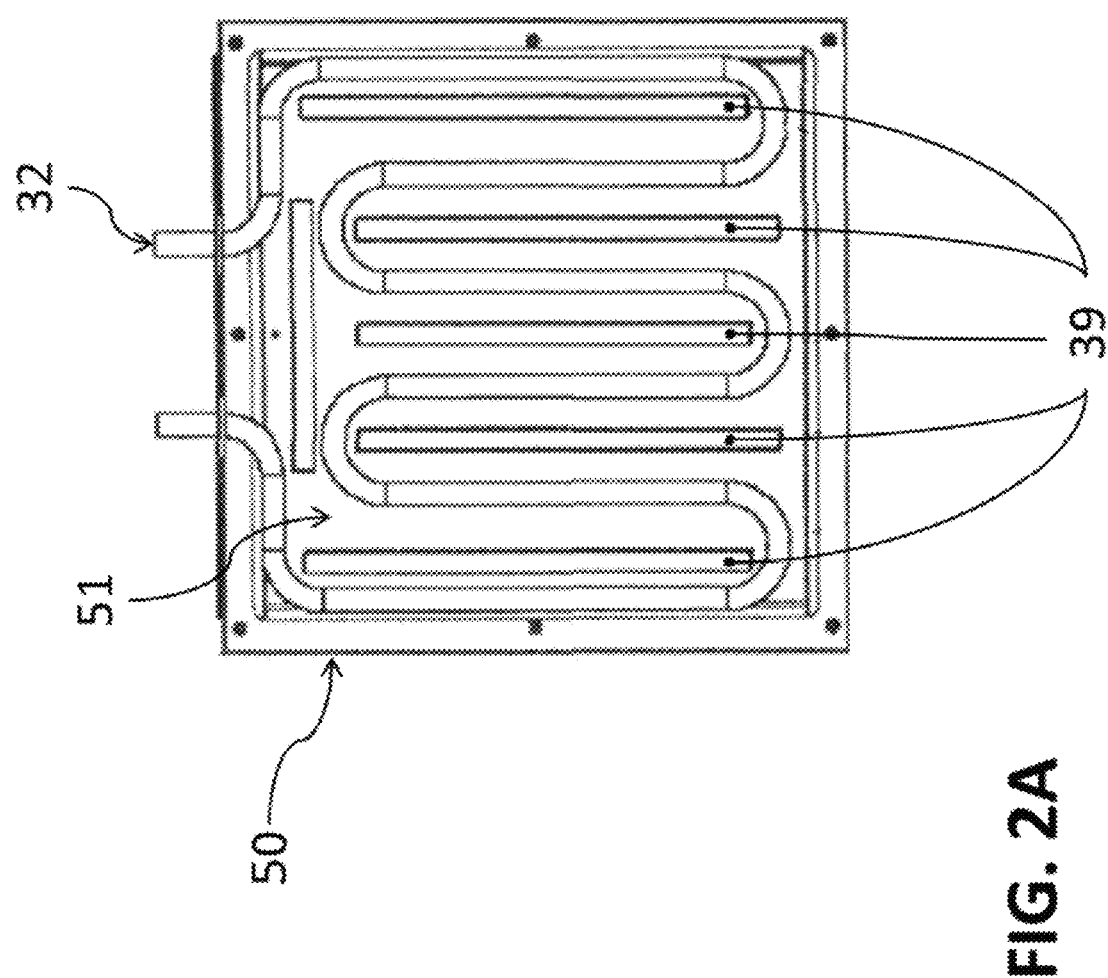
FIGS. 2A-2B are respectively top view and isometric cutaway view of the bottom infrared heating element and the bottom thermal insulating layer for the oven from FIG. 1, in accordance with an exemplary embodiment of the present invention.
Figure 2B:
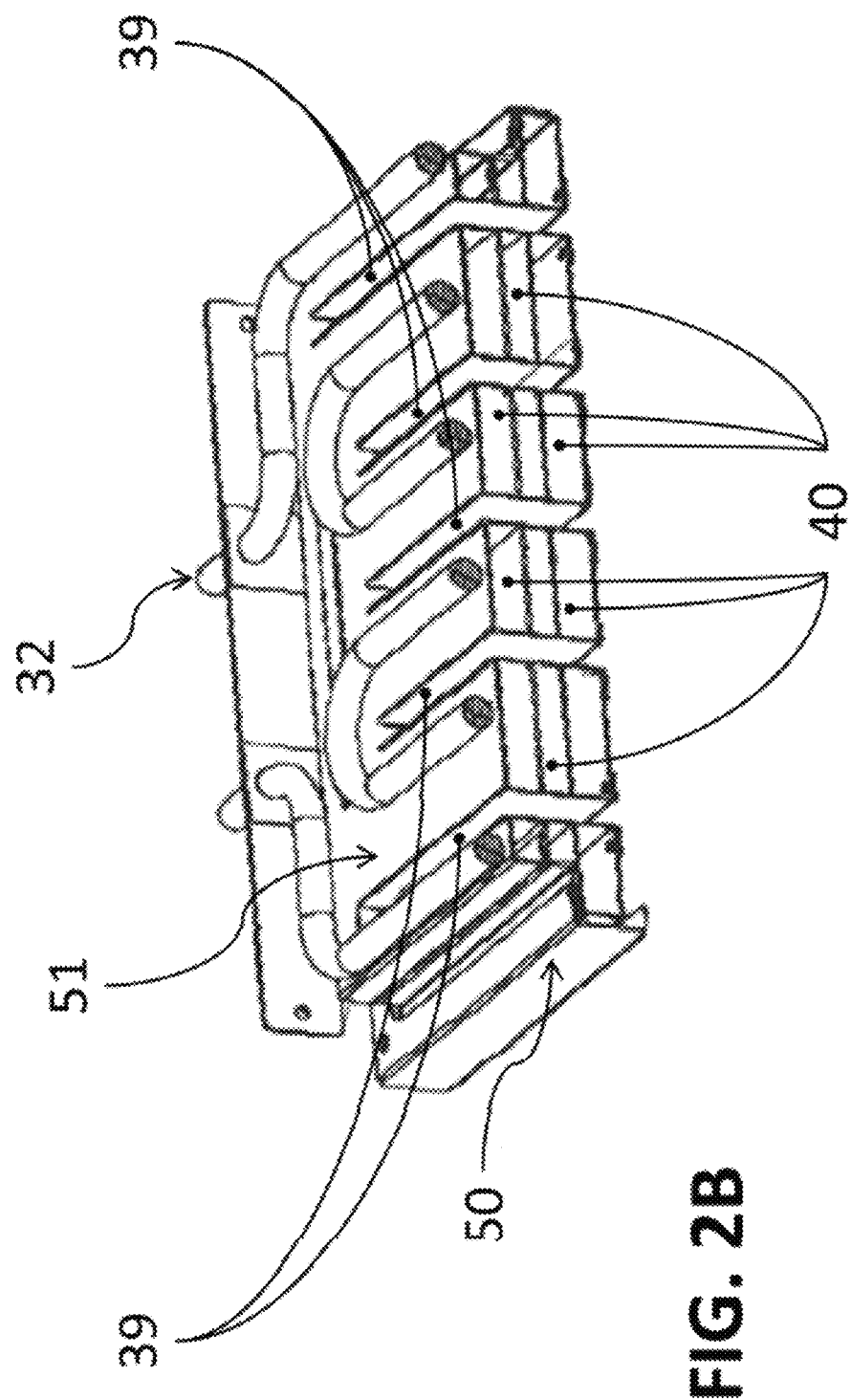

Referring now to FIGS. 2A-2B, there are illustrated a top view and an isometric cutaway view of the bottom infrared heating element 32 and the bottom thermal insulating layer 50. The top infrared heating element 32' and the top thermal insulating layer 50' may be substantially identical in structure to their bottom counterparts 32, 50 shown in FIGS. 2A-2B, except that the top components would be oriented upside down.

In this exemplary embodiment of the present invention, the air channels 39 for bringing heated air from the air plenum 38 into oven cavity 17 are separated from the IR heating element 32 in such a way that the IR heating element 32 is not substantially cooled by rapidly moving airstream coming through air channels 39 at a lower temperature and is allowed to quickly reach and maintain the desired temperature—typically in the 1,200° F. range.

While FIGS. 2A and 2B show air channels 39 in the form of multiple rectangular shaped tubes, it is understood by those skilled in the art that air channels may alternatively take the form of one of various other air opening configurations such as conical shaped nozzles and the like.

Preferably, the air channels 39 are placed far enough apart to enable air to be moved directly towards the surface of the food at the desired air velocity—but close enough together to offer full and even hot air cooking coverage (i.e., no "cold spots" or "hot spots"). The IR heating element 32 is configured to be placed between the air channels 39, but placed far enough away from the air channels to keep it from being in contact with airstreams coming out of the air channels. For example, the closest distance between the air outlet side of each of air channels 39 and IR heating element 32 may be no less than 0.1 inches and no greater than 4 inches.

At the same time, the IR heating element 32 is preferably spread sufficiently widely to offer full and even IR heating coverage in the cavity 17 (i.e., no "light spots" or "dark spots"). As shown in FIG. 2A, a single IR heating element 32 may be used instead of multiple IR heating elements for several reasons, including continuity of temperature and cost.

As shown in FIG. 2A, IR heating element 32 may comprise a wire-like heating element shaped in a serpentine-like pattern to form multiple U-shape fingers. While five U-shape fingers are shown in FIG. 2A, the number and shape of U-shape fingers in the IR heating element 32 may vary depending on, for example, the size of the oven cavity 17 and/or the number and configuration of air channels 39.

The IR heating element 32 may further comprise an outer sheathing covering a resistance wire. Within the sheathing, a temperature sensor or thermocouple (not shown) may be embedded to measure the operating temperature of IR heating element 32 so that when the rapidly moving hot air cools IR heating element 32 and thereby reduces its infrared radiation output, control circuitry may supply higher power for maintaining the same infrared output. In other words, to the extent that air moving by IR heating element 32 impacts its temperature, the IR heating element can maintain a constant temperature by using feedback control and applying variable power.

In addition, the IR heating element 32 may be designed to gain heat quickly and lose heat quickly. This feature could be important when the oven needs to alternately cook different food items, some of which require heat from IR heating element 32 at 1,200° F. and some of which do not require heat from IR heating element 32 but need to be cooked at a much lower temperature.

As shown in FIGS. 2A and 2B, a plurality of air channels 39 may be interleavingly located between the U-shape fingers of IR heating element 32. Air channels 39 are designed to prevent hot airstreams from substantially contacting and thereby convectively cool IR heating element 32.

In alternative embodiments, the vertical length of each of air channels 39 may correspond to the thickness of thermal insulating layer 50, which separates air plenum 38 from IR heating element 32. Preferably, each of air channels 39 has sufficiently long vertical length so that the rapidly moving heated air delivered by blower 33 through plenum 38 and into air channels 39 develops sufficient directionality to emerge from the air outlet side of air channels 39 without being substantially dispersed, thereby passing the adjacent IR heating element 32 without substantially contacting it. At the same time, preferably, the vertical length of each of air channels 39 is not so long as to unnecessarily increase the height and related manufacturing cost of the oven.

As an example, the optimal vertical length of air channel 39 may be between 0.5 inches and 12 inches. On the one hand, the vertical length less than 0.5 inches would not provide sufficiently thick thermal insulating layer 50 to thermally insulate air plenum 38 from the heat generated by the IR heating element 32. On the other hand, the vertical length greater than 12 inches (or greater than 20 inches for both top and bottom air channels 39', 39) would make the oven too tall and unnecessarily increase the related manufacturing cost.

As shown in FIGS. 1A-1B and 2A-2B, a thermal insulating layer 50 may be placed between IR heating element 32 and air plenum 38 so that air plenum 38 is not substantially heated by IR heating element 32 and the temperature in air plenum 38 can be kept in the desired temperature range (such as 450° F.-500° F. range) when IR heating element 32 is on. In this way, the temperature of IR heating element 32 can be increased without materially increasing the temperature of the air in the air plenum 38.

As shown in FIG. 2B, the thermal insulating layer 50 may comprise one or more temperature decoupling chambers 40, which are located underneath each of the U-shape fingers of IR heating element 32. Temperature decoupling chambers 40 are designed to thermally insulate air plenum 38 from IR heating element 32 so that IR heating element 32 does not conductively heat air plenum 38. For example, the temperature decoupling chambers 40 may be filled with air which can act as a thermal insulator.

For example, the thermal insulating layer 50 may be made of stainless steel sheets separated by one or more gaps forming temperature decoupling chambers 40 (e.g., gaps filled with a thermal insulator such as air). Air tubes may be inserted in the openings of the stainless steel sheets to form air channels 39 such that the heated air enters the air channels 39 from the air plenum side 38 and exits into the cook cavity side 17. Such airstreams into the cavity would be adjacent to, but not in contact with, the IR heating element 32. As a result, this exemplary embodiment of the present invention enables a relatively tight range of air temperatures to be delivered simultaneously with heat from IR heating element 32 to a food item located within the oven cavity 17.

In alternative embodiments, the temperature decoupling chambers 40 may also serve as a heat sink for the heat generated by the IR heating element 32. This has the additional benefit of smoothing out the changes in the air temperature in the oven cavity 17 as the IR heating element 32 rapidly heats and cools.

In alternative embodiments, the vertical length of each of air channels 39 may correspond to the thickness of thermal insulating layer 50, or the height of temperature decoupling chambers 40, which separate air plenum 38 from IR heating element 32. This can be measured by the distance between the top of air plenum 38 and the surface 51 of thermal insulating layer 50 on the air outlet side ("insulating layer output surface"). Preferably, the vertical length of each of air channels 39 and/or the closest distance between insulating layer output surface 51 and IR heating element 32 may be dimensioned to optimize the isolation or decoupling of the heated air at a relatively cooler temperature (such as 450° F.-500° F.) moving through air channels 39 from IR heating element 32 at a higher temperature (such as 1,200° F.), without adding unnecessary height or manufacturing cost to oven 10. For example, the vertical length of air channels 39 may be between 0.5 inches and 12 inches, and the closest distance between insulating layer output surface 51 and IR heating element 32 may be between 0.1 inches and 1 inch.

Some food items, such as certain vegetables, may need to be cooked with hot air only, and IR heating element 32, 32' should be turned off or should only be barely turned on to keep the surface of such food items from burning. With those food items, the air temperature within cavity 17 is preferably controlled within a relatively tight range. On the other hand, some food items, such as broiled shrimp, may need to be cooked with heat generated by IR heating element 32, 32' operating at 1,200° F. Suffice to say, there are also some food items that may need to be cooked with appropriate combination of hot air and heat from IR heating element 32, 32'.

These various cooking needs can be satisfied by operating the oven as an "IR only" oven, or an "hot air only" oven, or anywhere in between (e.g., 75% IR and 85% air; 100% IR and 45% air; etc.). The exemplary embodiments of the present invention described above can meet this objective by isolating or decoupling the air heating elements (e.g., air plenum 38) from the IR heating element (e.g., IR heating element 32).

In addition, by enabling independent top and bottom IR adjustments within each cook setting, the oven may be able to deliver independent top and bottom heat with only one blower—thus reducing the manufacturing cost considerably as opposed to having two distinct air delivery systems.

A cavity heater is typically used to keep the air temperature in the oven cavity from going too low. However, when not operating at a high temperature (e.g., 1,200° F.) to deliver full IR heating to the food, the IR heating element 32', 32 can also be used as means for boosting the air temperature in the oven cavity 17. This can be useful because some food items are not optimally cooked with IR heating. In cases where a food is best cooked exclusively or primarily with hot air, the IR heating element can be kept on at a reduced temperature such that it has some heating impact on the air in the cavity but does not have significant IR heating impact on the food. Such a feature would make it possible to have a reduced cavity heater size relative to ovens which cook only with heated air.

This object can be achieved by using a suitable heater control (e.g., user interface to control the IR heating element) to direct the IR heating element to serve as a booster air temperature heater to only provide the air heating capability that the downsized cavity heaters are not capable of providing.

In alternative embodiments, this heater control element may be further configured to manage whatever imperfection there may be in keeping the heated air and the IR heating element isolated or decoupled from each other. This may allow the IR heating element to operate at the highest possible temperature without substantially increasing the temperature of the heated air in the oven from the desired range. Despite the challenges due to the relatively long time delay between turning the IR heating element on and measuring a temperature rise in the air, the heater control element, such as the one described herein, may be configured to make it seamless to the user.

Figure 3A:
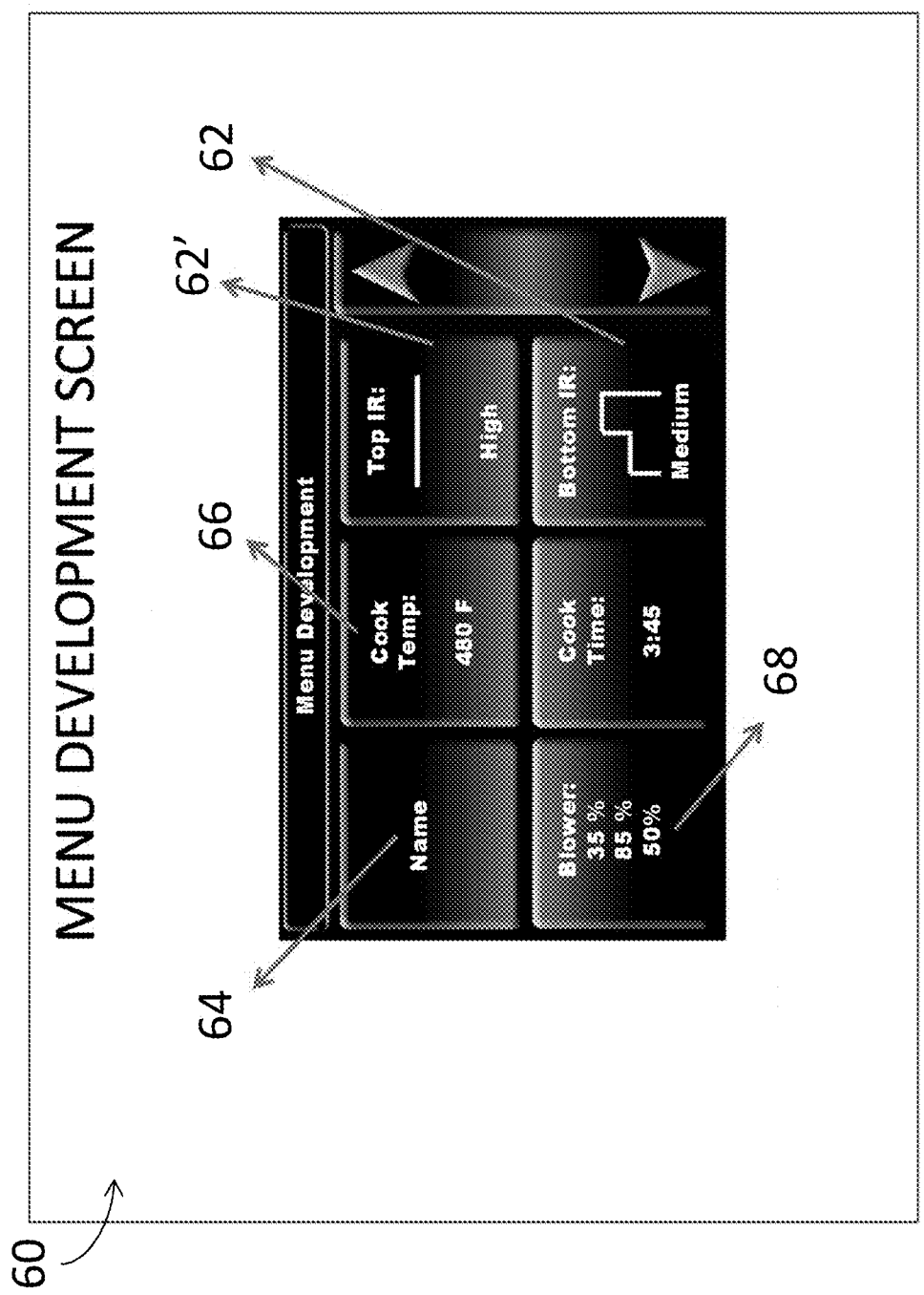
FIGS. 3A-3B illustrate exemplary user interfaces for the oven from FIG. 1, in accordance with an exemplary embodiment of the present invention.

In this connection, an exemplary embodiment of the present invention may further provide a user interface on the oven for entering IR heating settings. FIG. 3A illustrates an exemplary user interface screen 60 (e.g., menu development screen) that allows the user to set and change, for example, air speeds, cook time, cook temperature, IR power, to name a few, in each stage of a recipe. The user interface screen 60 may comprise a button 64 for a keyboard screen, a button 66 for a number pad screen, and a button 68 for a blower screen to select from multiple stages and input total time of stages (e.g., cook time). The user interface screen 60 may use a format generally in line with the industry standard for cook setting development, except that the screen additionally has a button 62' for controlling top IR heating element 32' and a button 62 for controlling bottom IR heating element 32, either of which takes the user to the IR heating control screen, which is illustrated in FIG. 3B.

Figure 3B:
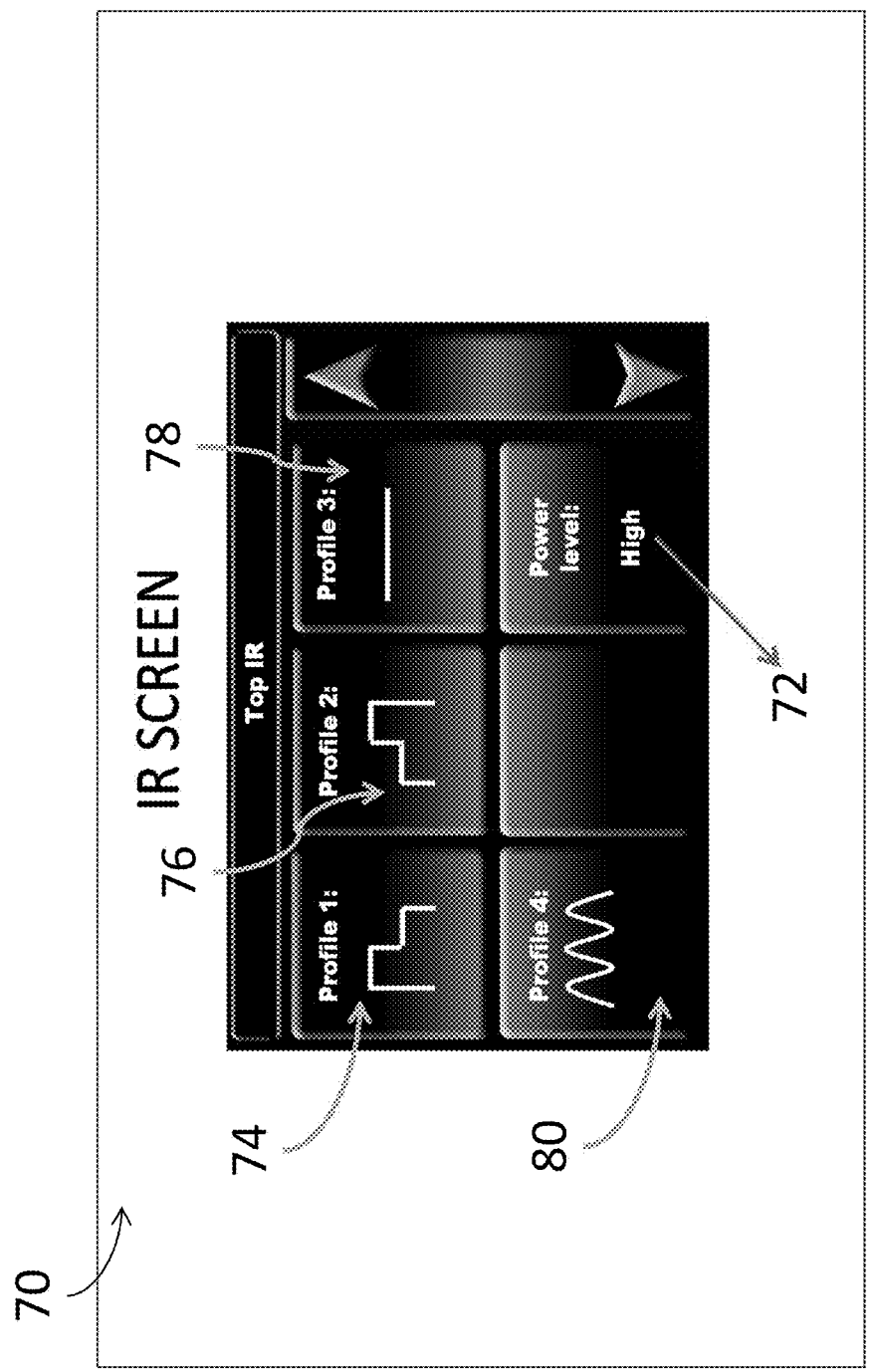

As shown in FIG. 3B, once at the IR screen 70 (e.g., "Top IR" for controlling top IR heating element 32'), the user may select one of various possible IR power levels and one of various possible IR temporal profiles to control the IR heating element (e.g., top IR heating element 32'). For example, selectable IR power levels may comprise off (e.g., using the IR heating element solely to boost heated air temperature), low, medium, and high. The user may select one of these IR power levels by scrolling through a button 72 on the IR screen 70. As shown in FIG. 3B, exemplary IR temporal profiles may comprise "Profile 1" for initially high and then low, step-down IR power levels (which can be selected by a button 74), "Profile 2" for initially low and then high, step-up IR power levels (which can be selected by a button 76), "Profile 3" for constant IR power level (which can be selected by a button 78), and "Profile 4" for oscillating IR power (which can be selected by a button 80).

As has been described, the present invention provides an improved oven that utilizes a combination of heated air and IR heating element for cooking food elements.

Figure 4:
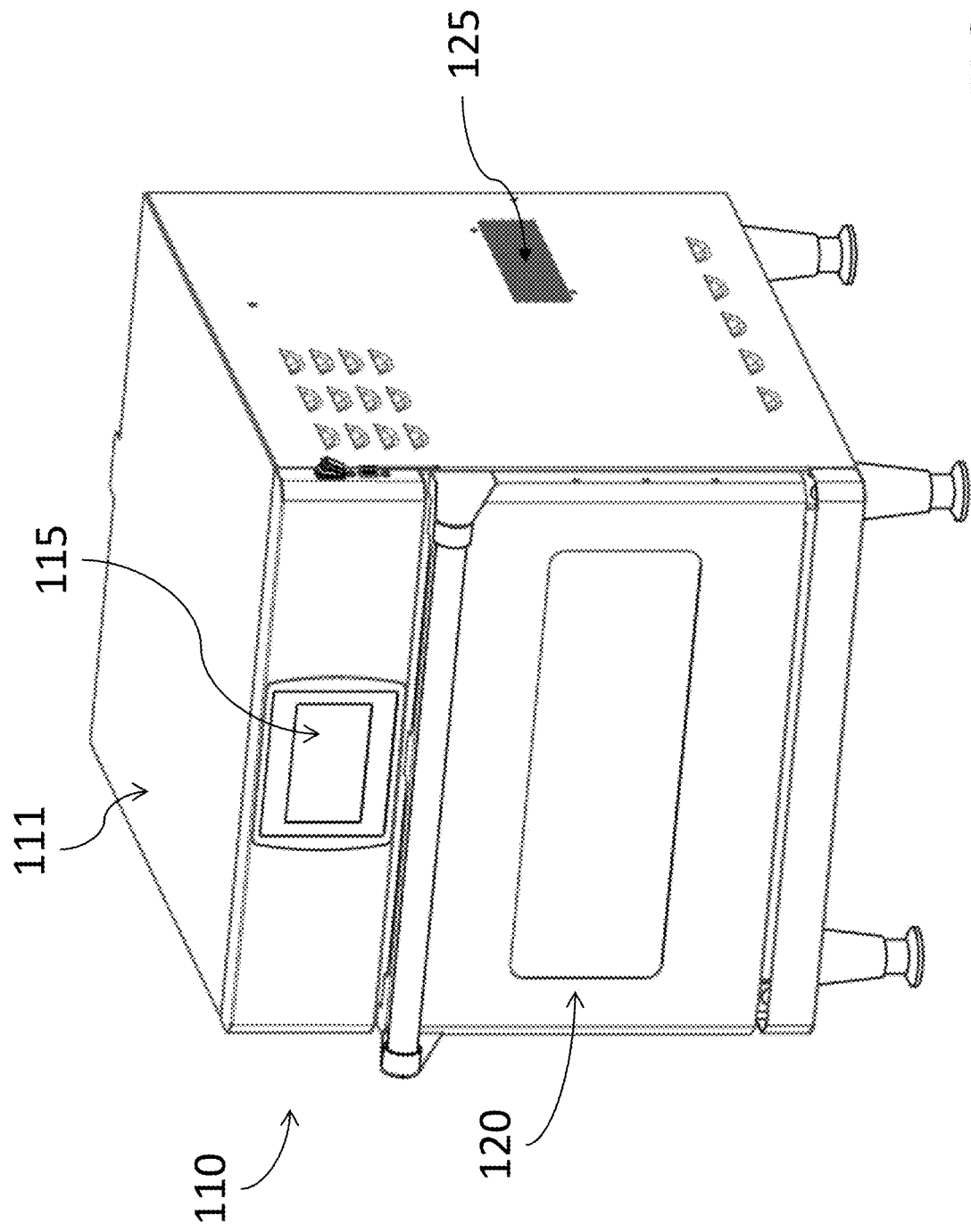
FIG. 4 is an isometric view of a cooking oven, in accordance with an exemplary embodiment of the present invention.
Figure 5:
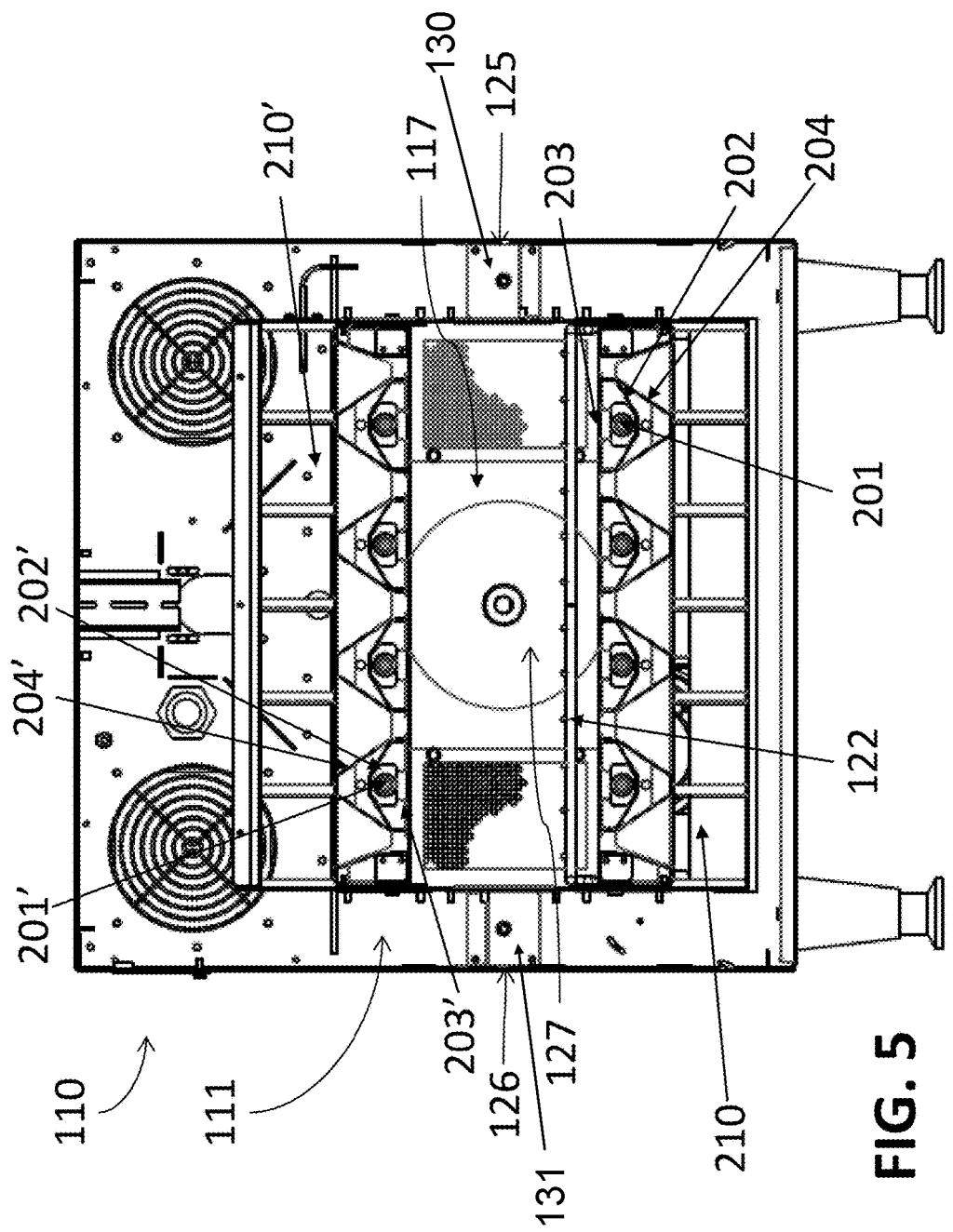
FIG. 5 is a front cross-sectional view of the cooking oven of FIG. 4, in accordance with an exemplary embodiment of the present invention.

Referring now to FIGS. 4 and 5, there are depicted respectively isometric and front cross-sectional views of a cooking oven having one or more active vents, in accordance with another exemplary embodiment of the present invention. As shown in the figures, an oven 110 includes a housing 111, a cook cavity 117 located within the housing, and an oven door 120 for covering an opening to the cavity, through which a food item may be loaded on a food loading section 122 within the cook cavity 117.

The oven 110 also includes a heating system to supply heat to the cook cavity 117 for heating up any food items that have been placed within the cook cavity. The oven 110 may use any type of heating elements in any configuration for the heating system, including but not limited to IR heating elements 201', 201 respectively disposed at the top and bottom of the cook cavity 117 as shown in FIG. 5 (see also FIG. 7) in accordance with an exemplary embodiment of the present invention. In this exemplary embodiment, the top IR heating element 201' is located below a top air plenum 210', and the bottom IR heating element 201 is located above a bottom air plenum 210 and below the food loading section 122. Exemplary embodiments of the IR heating elements 201', 201 that may be used in the oven 110 are further discussed below in connection with FIGS. 7, 8A-8B and 9A-8B. It is understood by those skilled in the art that other heating means, such as microwave, steam or a combination thereof, to name a few, can also be used in addition to IR heating elements 201', 201.

Figure 6:
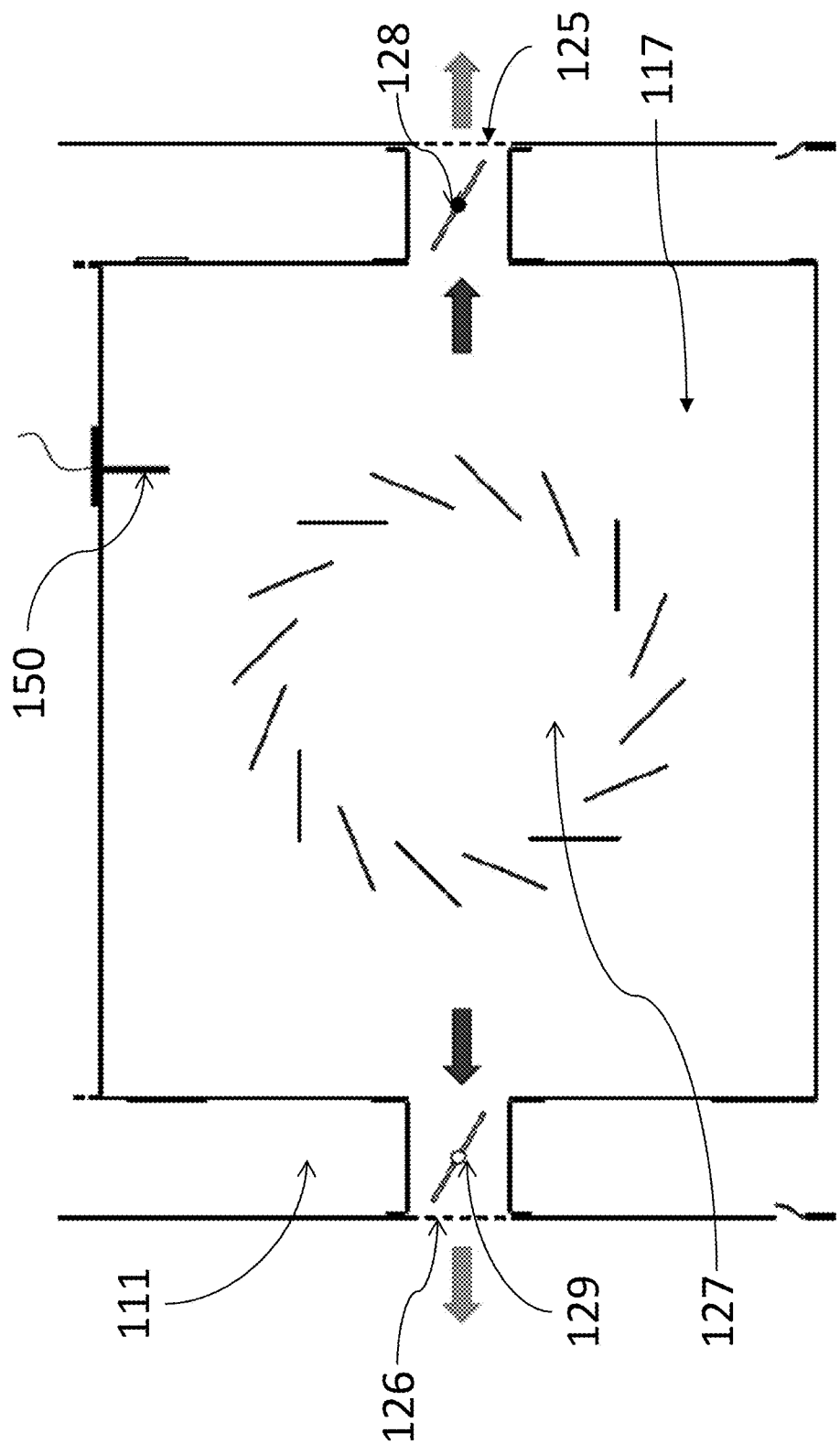
FIG. 6 schematically illustrates a front cross-sectional view of active vents in the cooking oven of FIG. 4, in accordance with an exemplary embodiment of the present invention.

The oven 110 also includes one or more active vents 125, 126, each forming a pathway of air flow interconnecting the cook cavity 117 and the outside of the housing 111 of the oven. A simplified schematic diagram in FIG. 6 provides a front cross-sectional view of the active vents 125, 126. Each of the active vents 125, 126 may be configured to be fully open, partially open, or closed in a controlled manner by using, for example, a rotatable flap 128, 129 as shown in FIG. 6.

The oven 110 also includes a blower 127, which may be located at, for example, the rear end of the cook cavity 117. The blower 127 may be used to expel or exhaust the air out of the cook cavity 117 to the outside of the housing 111 through the active vents 125, 126 as indicated by arrows in FIG. 6. The blower 127 may also be used to in-take or draw in the ambient or cold air from the outside of the housing 111 into the cook cavity 117 through the active vents 125, 126.

In embodiments, the active vent 125, 126 may be configured to allow the blower 127 to expel the air out of the cook cavity 117 and in-take the cold exterior air into the cook cavity 117, all at the same time. For example, the blower 127 located at the rear end of the cook cavity 117 can expel the air out of the cook cavity 117 through the portion (e.g., the rear half) of the active vent 125, 126 that is closer to the rear of the cook cavity 117 (and thus closer to the blower 127) and, at the same time, also draw in the ambient air from the outside of the housing 111 into the cook cavity 117 through the portion (e.g., the forward half) of the active vent 125, 126 that is farther away from the rear of the cook cavity 117. In other words, the rear half of the active vent 125, 126 may be configured to expel the heated air from the cook cavity 117 to the outside of the housing 111, while the forward half of the active vent 125, 126 may be configured to in-take the cold exterior air from the outside of the housing 111 into the cook cavity 117. In embodiments, each of the active vents 125, 126 may further comprise a sheet metal divider 130, 131 at the center to separate the rear half and forward half to minimize contact between or mixing of the hot air being expelled from the cook cavity 117 and the cold air being drawn in to the cook cavity 117.

While FIG. 6 schematically illustrates two active vents 125, 126 located at the right and left sides of the cook cavity 117, respectively, the present invention does not in any way restrict the number or location of an active vent in a cooking oven. For example, the oven 110 may instead have only one active vent, three or more active vents, active vent(s) located at the top, bottom, or rear of the cook cavity 117, etc.

In embodiments, active vent(s) may be positioned in such a way as to take advantage of the blower 127 to facilitate exchanging hot and cold air in the cook cavity 117. For example, an active vent configured to exhaust hot air from the cook cavity 117 to the outside of the housing 111 may be located at the high pressure side of the blower 127, while an active vent configured to in-take ambient cold air from the outside of the housing 111 into the cook cavity 117 may be located at the low pressure side of the blower 127.

For example, the dimension of each of the active vents 125, 126 may be 6.4" in length and 1.87" in height, while the dimension of the cook cavity 117 may be 15.5" in width, 15.5" in depth and 5.13" in height.

The oven 110 may also include a controller for controlling the operation of the oven 110 and its component features (e.g., heating elements 201', 201, rotatable flap 128, 129 for opening and closing the active vent 125, 126, blower 127, to name a few). The controller may be implemented in digital electronic circuitry, or in computer software, firmware, or hardware. For example, the controller may comprise one or more processors for executing instructions. Instructions (also known as a program, software, software application, or code) can be written in any form of programming language, including compiled or interpreted languages, and they can be deployed in any form, including as a stand-alone program or as a module, component, subroutine, or other suitable form executable by a processor.

Processors suitable for the execution of instructions in the controller include, by way of example, both general and special purpose microprocessors, and any one or more processor of any kind of digital computer. Generally, a processor may be configured to receive instructions and data from a read only memory or a random access memory or both.

The controller may further comprise one or more memories suitable for storing instructions and/or data. Suitable memories for the controller include, by way of example, all forms of volatile memory and non-volatile memory, such as random access memory, semiconductor memory devices (e.g., erasable programmable read-only memory (EPROM), electrically erasable programmable read-only memory (EEPROM), and flash memory), magnetic disks (e.g., internal hard disks or removable disks), magneto optical disks, optical disks (e.g., compact discs (CDs) and digital versatile discs (DVDs)), to name a few.

For example, the controller for the oven 110 may comprise Atmel processor, standard random access memory, and custom embedded firmware.

In embodiments, the processor and the memory in the controller may be supplemented by, or incorporated in, special purpose logic circuitry, such as a field programmable gate array (FPGA), or an application specific integrated circuit (ASIC).

In embodiments, the controller in the oven 110 may be further configured to be operatively coupled to receive instructions and/or data from, and/or transfer instructions and/or data to, one or more mass storage devices, such as USB stick, magnetic disk, magneto optical disks, and optical disks. For example, the oven firmware in the controller can be updated via USB stick; logs (e.g., cook logs, error logs, to name a few) created and maintained by the controller can be downloaded from the controller to USB stick; menus and recipes can be uploaded from the USB stick to the controller and/or downloaded from the controller to the USB stick.

To provide for interaction with a user, the controller in the oven 110 may include or be operatively coupled to a user interface, such as a control panel 115 shown in FIG. 4. The control panel 115 may be implemented with a display device, such as a cathode ray tube (CRT), or liquid crystal display (LCD) monitor, to name a few, for displaying information to the user, and an input device, such as a touchscreen, a keyboard, or a pointing device (e.g., a mouse or a trackball), to name a few, by which the user can provide input to the controller. In alternative embodiments, additional or other kinds of devices, such as a smart phone, or a tablet PC, to name a few, can be used to provide for connected or wireless interaction between the controller and a user. In exemplary interactions between the controller and the user, feedback provided to the user can be any form of sensory feedback, (e.g., visual feedback, auditory feedback, or tactile feedback, to name a few), and input from the user can be received in any form, including acoustic, speech, or tactile input.

In embodiments, the control panel 115 in the oven 110 may include the user interface screen for menu development 60 and/or user interface screen for controlling the IR heating element 70 that are shown in FIGS. 3A-3B, respectively, and described above in connection with those figures.

Figure 10:
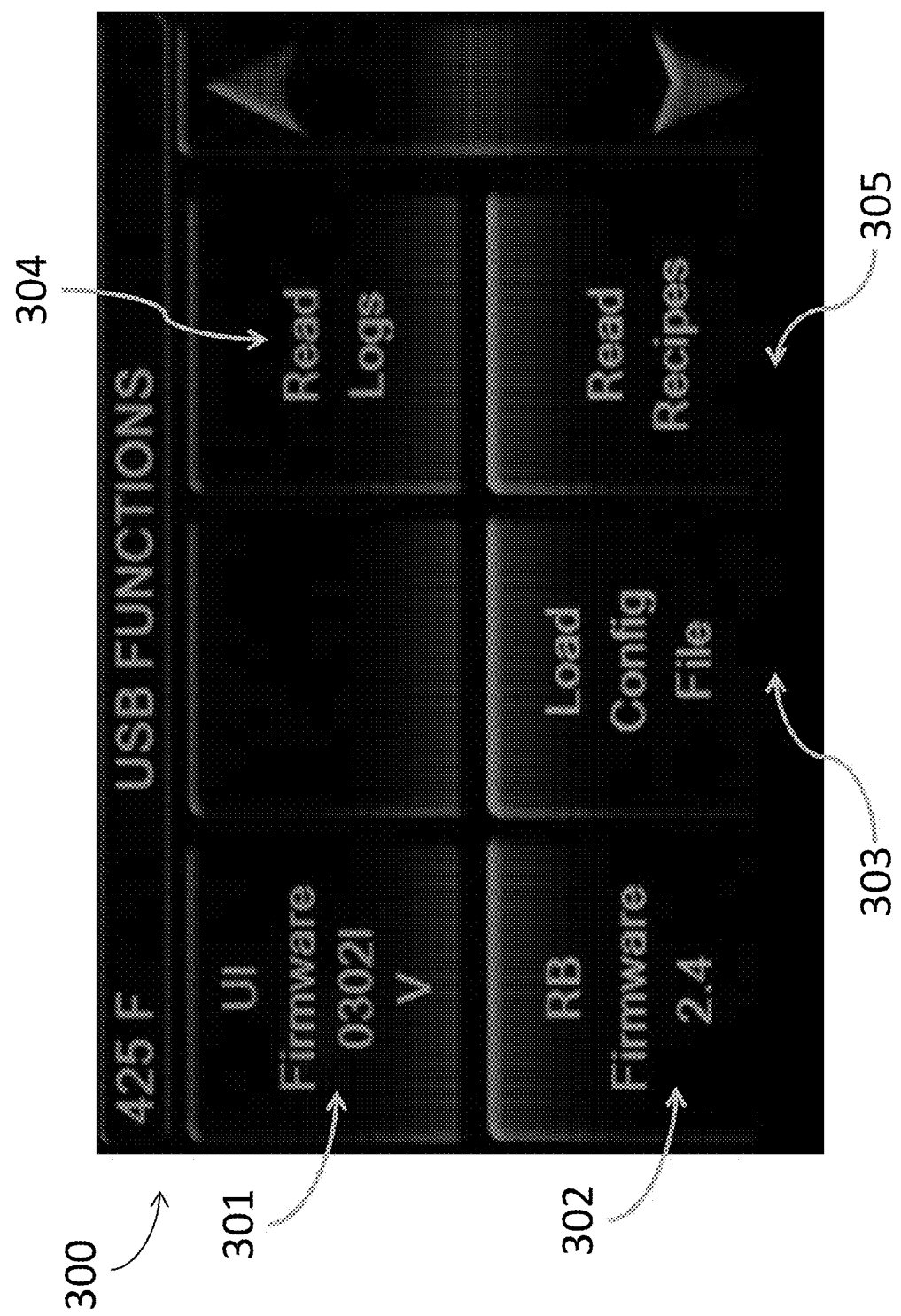
FIG. 10 illustrates an exemplary user interface for the oven from FIG. 4, in accordance with an exemplary embodiment of the present invention.

In embodiments, the control panel 115 may also include a USB input/output screen 300 shown in FIG. 10. As discussed above, in embodiments, the oven firmware in the controller can be updated via USB stick; logs (e.g., cook logs, error logs) created and maintained by the controller can be downloaded from the controller to USB stick; and menus and recipes can be uploaded from the USB stick to the controller and/or downloaded from the controller to the USB stick. In this connection, as shown in FIG. 10, the USB input/output screen 300 may comprise one or more buttons 301, 302 for identifying and updating the oven firmware, a button 303 for uploading a file (e.g., menus) from the USB stick to the controller, a button 304 for downloading logs (e.g., cook logs, error logs) from the controller to the USB stick, and a button 305 for downloading recipes from the controller to the USB stick.

In embodiments, the cook cavity 117 may further comprise a sensor 150 as shown in FIG. 6. The sensor 150 may comprise a temperature sensor (e.g., thermocouple), moisture sensor, or a combination thereof to monitor the air temperature and/or moisture level in the cook cavity 117. The sensor 150 is operatively coupled to the controller of the oven 110 and may also be operatively coupled to the control panel 115 to display the measured temperature/moisture level in the cook cavity 117.

The use of the active vents 125, 126 in a controlled manner by the controller in the oven 110 may provide various benefits, including: (1) ability to control the moisture level within the cook cavity 117 during an individual cooking cycle; and (2) tighter control of temperature feedback loop, which enables reduction of excess heat buildup within the cook cavity 117 and also enables faster cool down of the cook cavity 117.

Varying moisture levels within the cook cavity 117 by selectively opening and closing the active vents 125, 126 during a cooking cycle can impact the quality of a food item being cooked in the oven 110. In particular, relatively high amount of moisture is found to be released during an initial stage of the cooking cycle and then after the initial stage, much less moisture is found to be released as the cooking cycle progresses. As such, unexpected improvements in cooking results based on moisture control can be achieved by keeping the active vents 125, 126 closed (e.g., by the rotatable flaps 128, 129) during an initial stage of the cooking cycle (e.g., initial ½, ⅓, or ¼ of the cooking cycle, to name a few) and then keeping the active vent at least partially open during at least a portion of the remainder of the cooking cycle (e.g., remaining ½, ⅔, or ¾ of the cooking cycle, to name a few). Any heat lost from the cook cavity 117 through the active vents 125, 126 can be made up by the increased output of the heating element 201', 201 as needed.

For example, the controller in the oven 110 may be operatively coupled to the rotating mechanism (e.g., rotator or motor) for the rotatable flaps 128, 129 to control opening and closing and the degree of opening of the active vents 125, 126, and also to the heating element 201', 201 to control the heat outputs. The controller may further comprise one or more processors and one or more memories operatively coupled to the one or more processors and having stored thereon instructions that are executable by the one or more processors to cause the controller to perform the steps of:

(a) turning on the heating element 201', 201 to initiate a cooking cycle;

(b) keeping the active vents 125, 126 closed (e.g., by closing the rotatable flap 128, 129) during an initial stage of the cooking cycle (e.g., initial ½, ⅓, or ¼ of the cooking cycle, to name a few);

(c) after the initial stage of the cooking cycle, opening the active vent 125, 126 (e.g., by opening the rotatable flap 128, 129 at least in part); and (d) keeping the active vent 125, 126 at least partially open during at least a portion of a remainder of the cooking cycle (e.g., remaining ½, ⅔, or ¾ of the cooking cycle, to name a few).

In embodiments, the cook cavity 117 may further comprise a sensor 150 as shown in FIG. 6. The sensor 150 may comprise a temperature sensor (e.g., thermocouple), moisture sensor, or a combination thereof to monitor the air temperature and/or moisture level in the cook cavity 117. The sensor 150 may be operatively coupled to the controller of the oven 110 and may also be operatively coupled to the control panel 115 to display the measured temperature/moisture level in the cook cavity 117. In embodiments, the controller may be configured to adjust its control of opening and closing of the active vents 125, 126 and/or the heat output of the heating element 201', 201 based on the reading of the air temperature and/or moisture level in the cook cavity 117 by the sensor 150.

The use of active vents, such as the active vents 125, 126 shown in FIGS. 4-6, in a controlled manner may also provide the benefit of tighter control of the temperature feedback loop—both during a cooking cycle and between sequential cooking cycles. For example, controlled opening and closing of the active vents 125, 126 by the controller enables the escape of excess heat buildup when the benefits of IR heating (toasting) are desired for a particular food item but the air in the cook cavity 117 gets too hot for optimal cooking of that item. As another example, the use of the active vents 125, 126 enables faster cool down of the cook cavity 117, which may be necessary under the following exemplary situations:

When it is desirable to cook a food item at a relatively low temperature (e.g., 350° F.) immediately following a cook at a relatively higher temperature (e.g., 500° F.).

When it is desirable to begin a cook at a higher temperature and finish at a lower temperature.

When it is desirable to cool an oven quickly at the end of a shift before cleaning.

Removal of heat from a cook cavity of an oven is dependent upon the size of the thermal mass including the cook cavity plus the air recirculating system, along with the desired temperature change ($\Delta T$). As such, the use of the active vents 125, 126 can provide an additional degree of control over the cooling down of the cook cavity 117.

Figure 7:
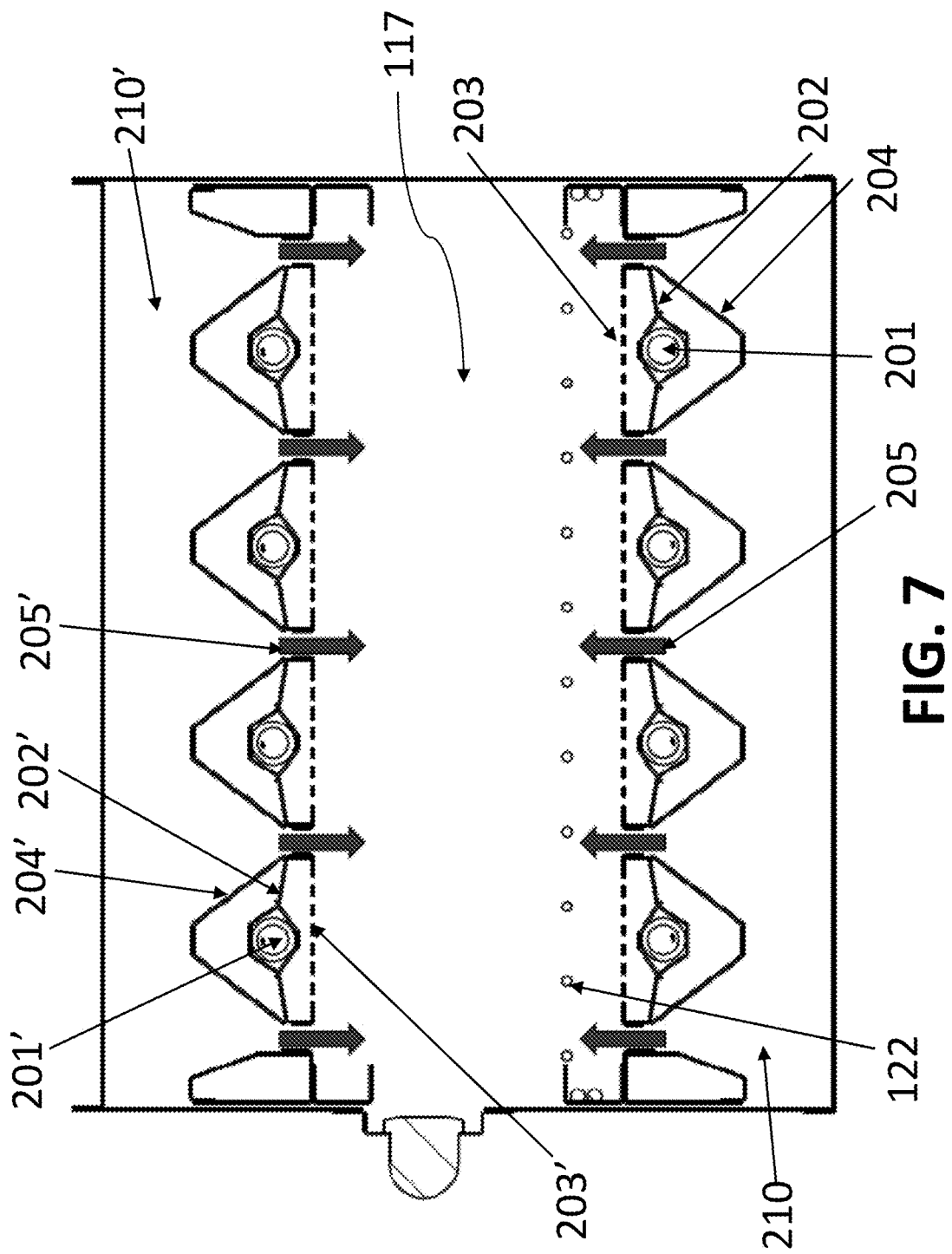
FIG. 7 provides a front cross-sectional view of infrared heating elements located at the top and bottom of a cook cavity in a cooking oven in accordance with an exemplary embodiment of the present invention.

Referring now to FIGS. 5, 7, 8A-8B and 9A-9B, there are depicted various views of exemplary embodiments of the IR heating elements 201', 201 that may be used in the oven 110. As shown in FIGS. 5 and 7, an array of one or more top IR heating elements 201' may be positioned between the top air plenum 210' and the top portion of the cook cavity 117, while an array of one or more bottom IR heating elements 201 may be positioned between the bottom portion of cook cavity 117 and the bottom air plenum 210, below the food loading section 122. The top air plenum 210' is configured to introduce an air into the cook cavity 117 (indicated by down arrows in FIG. 7) through top air channels 205', each of which is formed between two adjacent top IR heating elements 201'. Similarly, the bottom air plenum 210 is configured to introduce an air into the cook cavity 117 (indicated by up arrows in FIG. 7) through bottom air channels 205, each of which is formed between two adjacent bottom IR heating elements 201.

Figure 8:
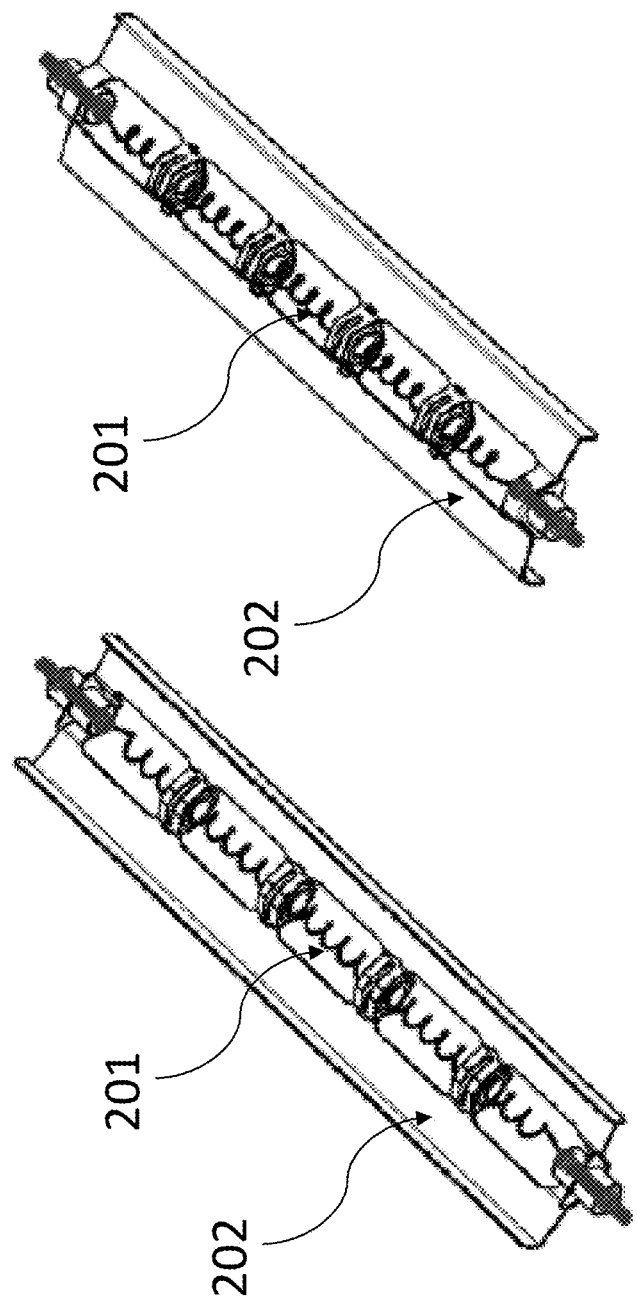
FIGS. 8A-8B are respectively top and bottom isometric views of an infrared heating element and its housing located at the bottom of the cook cavity in the cooking oven of FIG. 7, in accordance with an exemplary embodiment of the present invention.

FIGS. 8A-8B provide top and bottom isometric views of one of the bottom IR heating elements 201. As shown, the bottom IR heating element 201 may comprise a spirally wound wire element (e.g., heating coil). For example, the IR heating element 201 may comprise a heating coil having a wire gauge of 17 AWG, coil diameter of 0.5" OD, coil length of 11.85", voltage per coil of 52V, and power per coil of 650 W. As shown, each of the bottom IR heating elements 201 may be further disposed in a housing 202.

As shown in FIG. 7, each of the bottom IR heating elements 201 may be separated from the bottom air plenum 210 by a shield 204. The shield 204 may comprise a layer of a non-perforated sheet metal to keep the bottom IR heating element 201 from being directly exposed to the air in the bottom air plenum 210.

Figure 9:
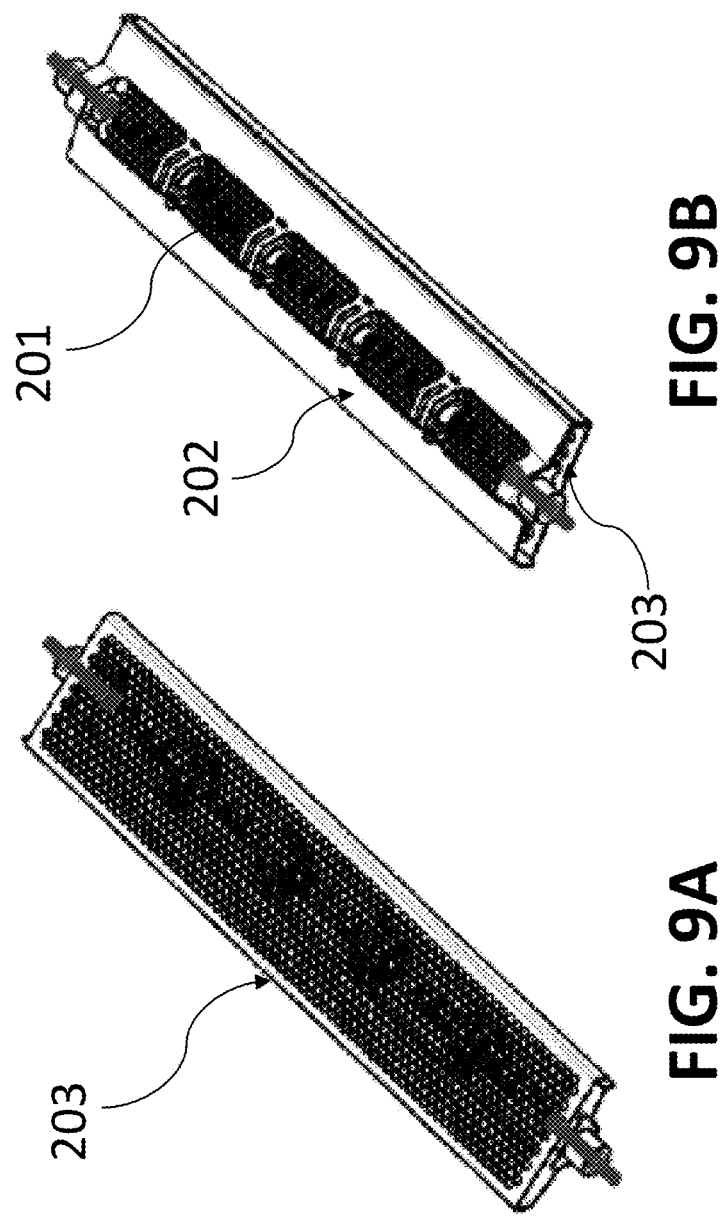
FIGS. 9A-9B are respectively top and bottom isometric views of the infrared heating element and its housing of FIGS. 8A-8B that are now covered by a perforated guard for separating the infrared heating element from the cook cavity, in accordance with an exemplary embodiment of the present invention.

In addition, as shown in FIGS. 7 and 9A-9B, each of the bottom IR heating elements 201 may be separated from the cook cavity 117 by a guard 203. The guard 203 may comprise a layer of a perforated sheet metal to keep the bottom IR heating element 201 from, for example, being touched by a user of the oven while still enabling the heat output from the IR heating element 201 to pass through to the cook cavity 117.

In embodiments, the top IR heating elements 201' may be configured in the identical structure as the bottom IR heating element 201 and differ only in direction of the structure. For example, the top IR heating element 201' may comprise a spirally wound wire element (e.g., heating coil) and be disposed in a housing 202'. Each of the top IR heating elements 201' may be separated from the top air plenum 210' by a shield 204' comprising a layer of a non-perforated sheet metal to keep the top IR heating element 201' from being directly exposed to the air in the top air plenum 210'. In addition, each of the top IR heating elements 201' may be separated from the cook cavity 117 by a guard 203' comprising a layer of a perforated sheet metal to keep the top IR heating element 201' from, for example, being touched by a user of the oven while still enabling the heat output from the IR heating element 201' to pass through to the cook cavity 117.

In embodiments, the IR heating elements 201', 201 may be used either under an IR mode for toasting a food item or under an air heating mode for heating the air in the cook cavity without toasting the food item. In other words, the IR heating elements may be controlled (e.g., by software or firmware implemented in the controller or by a user command entered via the control panel 115) in such a way that they do not produce much IR heating while providing the heat required for convective cooking. In embodiments, the controller in the oven 110 may be configured to control the IR heating elements 201', 201 by selecting between the IR mode and the air heating mode.

Various methods of "pulsing" the IR heating elements can also be used to enable the delivery of heat sufficient for convective cooking without generating the toasting outcome resulting from IR cooking. In embodiments, the controller may be configured to control a temporal profile and a level of a power applied to the IR heating elements 201', 201. For example, the controller implemented with software or firmware may be configured to apply one or more pulses to the IR heating elements 201', 201, wherein each of the pulses may have predefined time duration and power level. This can be used to taper off the IR duty cycle as the air temperature within the cook cavity 117 climbs too high (e.g., as monitored by the sensor 150) so as to prevent temperature runaway. In alternative embodiments, this can be further supplemented by the controller opening and closing the active vent 125, 126 in a controlled manner.

As has been described, the present invention also provides an improved oven that utilizes one or more active vents.

While this invention has been described in conjunction with exemplary embodiments outlined above and illustrated in the drawings, it is evident that many alternatives, modifications and variations in form and detail will be apparent to those skilled in the art. For example, alternative embodiments of the present invention may be implemented in various types of cooking ovens such as an oven having a rotating door described in U.S. patent application Ser. No. 14/045,257 (now U.S. Pat. No. 9,326,639), or an oven having an H-shaped rotating door described in U.S. patent application Ser. No. 14/635,765 (now U.S. Pat. No. 9,480,364). Accordingly, the exemplary embodiments of the invention, as set forth above, are intended to be illustrative, not limiting, and the spirit and scope of the present invention is to be construed broadly and limited only by the appended claims, and not by the foregoing specification.

To the extent certain functionality or components "can" or "may" be performed or included, respectively, the identified functionality or components are not necessarily required in all embodiments, and can be omitted from certain embodiments of the invention.

To the extent that the foregoing description refers to the "invention" or "present invention," the present disclosure may include more than one invention.

What is claimed is:

1. An oven comprising:
    a housing;
    a cook cavity located within the housing, wherein the housing includes a food opening to the cook cavity and the cook cavity is configured to receive a food item through the food opening;
    an oven door for covering the food opening;
    a heating element configured to heat an air within the cook cavity;
    an active vent interconnecting the cook cavity and an outside of the housing, the active vent including a vent opening to the outside of the housing, the active vent including a divider separating the vent opening to the outside of the housing into a first pathway of airflow of the active vent and a second pathway of airflow of the active vent, the active vent including a controllable rotatable flap, the rotatable flap to open or close the active vent;
    a blower configured to expel the air within the cook cavity to the outside of the housing through the vent opening and the first pathway of airflow of the active vent and, at the same time, to draw in an ambient air from the outside of the housing through the vent opening and the second pathway of airflow of the active vent;
    the divider configured to keep separate the air to be expelled from the first pathway of airflow of the active vent through the vent opening, while at the same time allowing the ambient air to be drawn in through the vent opening and the second pathway of airflow of the active vent; and
    a controller operatively coupled to the rotatable flap and the heating element, the controller comprising:
        one or more processors; and
        one or more memories operatively coupled to the one or more processors and having stored thereon instructions that are executable by the one or more processors to cause the controller to perform the steps of:
            (a) turning on the heating element to initiate a cooking cycle;
            (b) keeping the rotatable flap closed during an initial stage of the cooking cycle;
            (c) after the initial stage of the cooking cycle, opening the rotatable flap; and
            (d) keeping the rotatable flap open during at least a portion of a remainder of the cooking cycle.

2. The oven of claim 1, wherein the controller is configured to control the moisture level within the cook cavity by opening or closing the rotatable flap.

3. The oven of claim 1, wherein the controller is configured to control heating and cooling of the cook cavity by opening or closing the rotatable flap.

4. The oven of claim 1, wherein the active vent is configured to enable reduction of excess heat buildup within the cook cavity.

5. The oven of claim 1, wherein the active vent is configured to enable a cooling down of the cook cavity.

6. The oven of claim 1, wherein the initial stage of the cooking cycle comprises an initial ½ of the cooking cycle and the remainder of the cooking cycle comprises remaining ½ of the cooking cycle.

7. The oven of claim 1, wherein the initial stage of the cooking cycle comprises an initial ⅓ of the cooking cycle and the remainder of the cooking cycle comprises remaining ⅔ of the cooking cycle.

8. The oven of claim 1, wherein the initial stage of the cooking cycle comprises an initial ¼ of the cooking cycle and the remainder of the cooking cycle comprises remaining ¾ of the cooking cycle.

9. The oven of claim 1, further comprising an air plenum positioned above or below the cook cavity, the air plenum being configured to introduce the air into the cook cavity.

10. The oven of claim 9, wherein the heating element is positioned between the air plenum and the cook cavity.

11. The oven of claim 1, wherein the heating element comprises one or more infrared heating elements.

12. The oven of claim 11, wherein each of the one or more infrared heating elements comprises a spirally wound wire element.

13. The oven of claim 11, wherein the one or more infrared heating elements are configured to operate under an infrared mode for toasting the food item in the cook cavity or under an air heating mode for heating the air within the cook cavity without toasting the food item.

14. The oven of claim 13, wherein the controller is configured to control the one or more infrared heating elements by selecting between the infrared mode and the air heating mode.

15. The oven of claim 11, wherein the controller is configured to control a temporal profile and a level of a power applied to the one or more infrared heating elements.

16. The oven of claim 11, wherein the controller is configured to apply one or more pulses to the one or more infrared heating elements, each of the one or more pulses having predefined time duration and power level.

17. The oven of claim 1, wherein the controller further comprises a user interface for receiving a command or an input from a user, the user interface being operatively connected to the one or more processors.

18. The oven of claim 10, wherein the heating element comprises one or more infrared heating elements and each of the one or more infrared heating elements is separated from the air plenum by a shield comprising a layer of a non-perforated sheet metal.

19. The oven of claim 10, wherein the heating element comprises one or more infrared heating element and each of the one or more infrared heating elements is separated from the cook cavity by a guard comprising a layer of a perforated sheet metal.

20. The oven of claim 1, wherein the heating element comprises a substantially horizontal array of multiple infrared heating elements.

21. The oven of claim 10, further comprising air channels, wherein the heating element comprises a substantially horizontal array of multiple infrared heating elements and each of the air channels is positioned between two of the infrared heating elements that are adjacent to each other, the air channels being configured to allow air flow from the air plenum to the cook cavity.

22. The oven of claim 1, further comprising a thermocouple operatively coupled to the controller, the thermocouple being configured to measure an air temperature within the cook cavity and transmit data relating to the air temperature to the controller.

23. The oven of claim 1, further comprising a sensor operatively coupled to the controller, the sensor being configured to measure a moisture level within the cook cavity and transmit data relating to the moisture level to the controller.

24. A method of controlling a moisture level within an oven during a cooking cycle, the oven comprising a housing, a cook cavity located within the housing, a heating element configured to heat an air within the cook cavity, an active vent interconnecting the cook cavity and an outside of the housing, the active vent including a vent opening to the outside of the housing, the active vent including a divider separating the vent opening to the outside of the housing into a first pathway of airflow of the active vent and a second pathway of airflow of the active vent, the active vent including a controllable rotatable flap, the rotatable flap to open or close the active vent, a blower configured to expel the air within the cook cavity to the outside of the housing through the vent opening and the first pathway of airflow of the active vent and, at the same time, to draw in an ambient air from the outside of the housing through the vent opening and the second pathway of airflow of the active vent, the divider configured to keep separate the air to be expelled from the first pathway of airflow of the active vent through the vent opening, while at the same time allowing the ambient air to be drawn in through the vent opening and the second pathway of airflow of the active vent, the method comprising the steps of:
(a) turning on the heating element to initiate the cooking cycle;
(b) keeping the rotatable flap closed during an initial stage of the cooking cycle;
(c) after the initial stage of the cooking cycle, opening the rotatable flap; and
(d) keeping the rotatable flap open during at least a portion of a remainder of the cooking cycle.

25. The method of claim 24, wherein the initial stage of the cooking cycle comprises an initial ½ of the cooking cycle and the remainder of the cooking cycle comprises remaining ½ of the cooking cycle.

26. The method of claim 24, wherein the initial stage of the cooking cycle comprises an initial ⅓ of the cooking cycle and the remainder of the cooking cycle comprises remaining ⅔ of the cooking cycle.

27. The method of claim 24, wherein the initial stage of the cooking cycle comprises an initial ¼ of the cooking cycle and the remainder of the cooking cycle comprises remaining ¾ of the cooking cycle.

28. An oven comprising:
a housing;
a cook cavity located within the housing, wherein the housing includes a food opening to the cook cavity and the cook cavity is configured to receive a food item through the food opening;
an oven door for covering the food opening;
a heating element configured to heat an air within the cook cavity;
a first active vent interconnecting the cook cavity and an outside of the housing, the first active vent including a first vent opening to the outside of the housing, the first active vent including a first divider separating the first vent opening to the outside of the housing into a first pathway of airflow of the first active vent and a second pathway of airflow of the first active vent, the first active vent including a controllable first rotatable flap, the first rotatable flap to open or close the first active vent;

a second active vent interconnecting the cook cavity and the outside of the housing, the second active vent including a second vent opening to the outside of the housing, the second active vent including a second divider separating the second vent opening to the outside of the housing into a first pathway of airflow of the second active vent and a second pathway of airflow of the second active vent, the second active vent including a controllable second rotatable flap, the second rotatable flap to open or close the second active vent;

a blower configured to expel the air within the cook cavity to the outside of the housing through the first vent opening and the first pathway of airflow of the first active vent and, at the same time, to draw in an ambient air from the outside of the housing through the first vent opening and the second pathway of airflow of the first active vent, and the blower configured to expel the air within the cook cavity to the outside of the housing through the second vent opening and the first pathway of airflow of the second active vent, and, at the same time, to draw in an ambient air from the outside of the housing through the second vent opening and the second pathway of airflow of the second active vent;

the first divider configured to keep separate the air to be expelled from the first pathway of airflow of the first active vent through the first vent opening, while at the same time allowing the ambient air to be drawn in through the first vent opening and the second pathway of airflow of the first active vent;

the second divider configured to keep separate the air to be expelled from the first pathway of airflow of the second active vent through the second vent opening, while at the same time allowing the ambient air to be drawn in through the second vent opening and the second pathway of airflow of the second active vent; and a controller operatively coupled to the first rotatable flap, the second rotatable flap, and the heating element, the controller comprising:

one or more processors; and one or more memories operatively coupled to the one or more processors and having stored thereon instructions that are executable by the one or more processors to cause the controller to perform the steps of:

(a) turning on the heating element to initiate a cooking cycle;

(b) keeping at least one of the first rotatable flap and the second rotatable flap closed during an initial stage of the cooking cycle; and (c) keeping at least one of the first rotatable flap and the second rotatable flap open during at least a portion of a remainder of the cooking cycle.

* * * * *